United States Patent [19]

Miles, Jr.

[11] 4,430,668
[45] Feb. 7, 1984

[54] DIGITAL FACSIMILES (FAST ADDITIVE COLOR SEPARATION INTERNEGATIVES MILES)

[76] Inventor: Ernest P. Miles, Jr., 2804 St. Leonard Dr., Tallahassee, Fla. 32312

[21] Appl. No.: 291,479

[22] Filed: Aug. 10, 1981

[51] Int. Cl.³ .............................................. H04N 1/46
[52] U.S. Cl. ........................................ 358/75; 358/80
[58] Field of Search ...................... 358/75, 76, 78, 79, 358/80

[56] References Cited

U.S. PATENT DOCUMENTS

| | | | |
|---|---|---|---|
| 3,671,666 | 6/1972 | Hennig | 358/75 |
| 4,275,413 | 6/1981 | Sakamoto et al. | 358/80 |
| 4,346,401 | 8/1982 | O'Hara | 358/75 |

OTHER PUBLICATIONS

"Color Picture Processing System", *National Technical Report*, vol. 22, No. 5, pp. 559–566, Oct. 1976.

*Primary Examiner*—Richard Murray
*Attorney, Agent, or Firm*—Craig & Burns

[57] ABSTRACT

A method and apparatus for producing color graphic images wherein color graphic data is input to a computer programmed to produce sequentially black and white images on a cathode ray tube representing respectively the images of cyan, magenta, yellow and black internegatives to be produced. The images are photographed sequentially as presented which upon development produce internegatives corresponding to cyan, magenta, yellow and black. The image may alternatively be output to a printer. The four negatives are then employed in a four color printing process to create control plates for use in the cyan, magenta, yellow and black units of a printing press.

32 Claims, 10 Drawing Figures

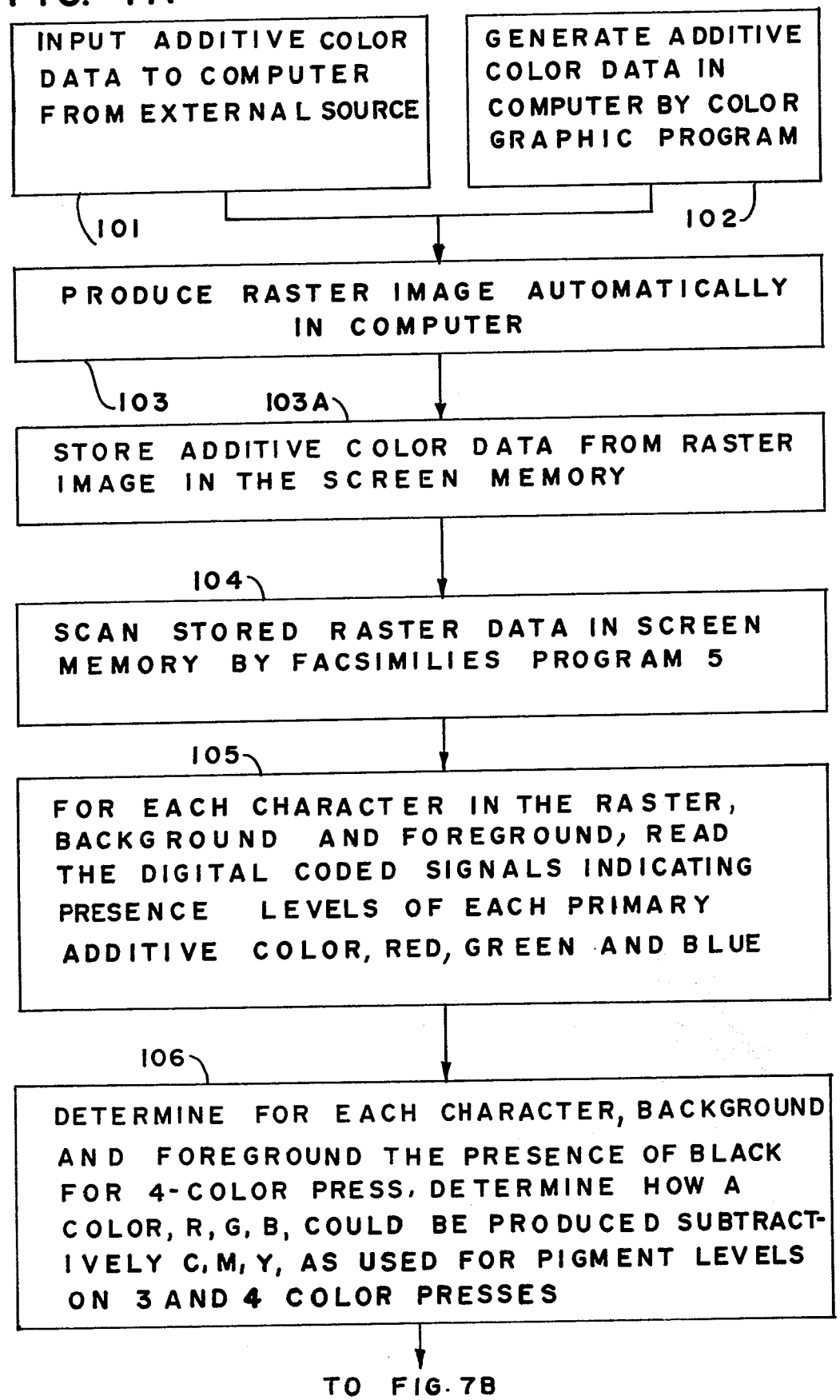

FIG. 7B

FROM FIG. 7A

↓

TRANSFORM SIGNALS REPRESENTING PRIMARY ADDITIVE COLORS TO DIGITAL CODE SIGNALS REPRESENTING PRIMARY SUBTRACTIVE COLORS AND BLACK.

↓ 120, 121

STORE DIGITAL CODE SIGNALS REPRESENTING SUBTRACTIVE COLORS IN RASTER FORM, CHARACTER MODE

↓ 122

SCAN STORED SUBTRACTIVE COLOR SIGNALS AND BLACK SIGNALS TO GENERATE OUTPUT SIGNALS REPRESENT THE PRESENCE OF EACH SUBTRACTIVE PRIMARY COLOR, CYAN, MAGENTA, YELLOW
(BLACK TREATED SEPARATELY FOR 4 COLOR PRESS)

↓ 123 ↓ 124

- SEQUENTIAL HARD DISPLAY OF BLACK AND WHITE SIGNAL ON PRINTER
- SEQUENTIAL SOFT DISPLAY OF BLACK AND WHITE ON COLOR CRT

↓ 125

PHOTOGRAPH IMAGES SEQUENTIALLY, ONE FOR EACH SUBTRACTIVE PRIMARY COLOR
(AND BLACK FOR 4-COLOR PRESS)

↓ 126

DEVELOP ONE INTERNEGATIVE FOR EACH SUBTRACTIVE PRIMARY COLOR
(AND BLACK FOR 4-COLOR PRESS)

↓ 127

GENERATE SCALED CONTROL PRINTS; PRINT IN MULTICOLOR

DIGITAL FACSIMILES (FAST ADDITIVE COLOR SEPARATION INTERNEGATIVES MILES)

BACKGROUND OF THE INVENTION

Previous apparatus and methods for production of large volume four color reproduction pigment printing of displays from raster screens of CRT terminals for computers proceed through three phases:

I. Producing a hard copy of the selected image by one of several means, such as direct photographs from the screen, computer controlled photographs on Polaroid ⓣ film generated from the CRT signal producing the image, or as the output of an attached color printer controlled by the computer signals for the image to be printed on the printer. Producing multiple copies by repeating this phase is possible, but usually not practical if many copies are required because of the cost in terms of time, materials and use of expensive equipment involved.

II. Performing color separations on the hard copy produced in phase I to produce four black and white internegatives needed to make the control plates for the cyan, magenta, yellow and black units of the typical four color press. This is usually done at a site remote from both phases I and III.

III. Converting the output of phase II to properly sized control plates and then producing the required number of copies by color printing in a traditional full color press.

In the past the inventor has employed the prior art phases to produce color block graphs for use on book or journal covers. These, and other graphs sought by editors and publishers have been subject to delay involved in passing through phase II, and attendant high cost. Costs of $200.00–$500.00 per page are common.

Recent survey articles or seminars on the rapidly growing color graphics area of the computer field cite hard copy as one of the major problems faced in assuring advance of this area. More and more computer generated graphics are being used for their information content in books, magazines or journal articles, for their beauty in advertising on book and magazine covers, wall paper, poster, wrapping paper and the like. Methods for reducing costs and time delays in mass printing of such graphics are thus needed to increase productivity, efficiency and usefulness.

SUMMARY OF THE INVENTION

An object of the invention is to separate colors in images using colors in self dual additive/subtractive color sets as to be described. Color separations for computer generated images using those colors are done on the host computer thus combining phases I and II to save both time and money. These color sets consist of $(1+2^k)^3$ colors where $k=0,1,2\ldots$.

For $k=0$, the eight colors are the three primaries, red, green and blue, the three subtractive primaries, cyan, magenta and yellow, and the starting colors for producing additive colors or subtractive colors, black and white, respectively. The case $k=0$ takes care of all images created on a standard Intecolor 8000 series display or comparable equipment.

It is an object of the invention to increase color resolution by displaying plural colors from an eight color set to produce a display which, to the eye, appears as a color intermediate to the plural colors.

For the case $k=1$, 27 colors, the additional 19 colors are added to the standard 8 using a special pointillism character designed by the inventor and available on Intecolor 8054 from the Intelligent Systems Corporation, Norcress, Ga., manufacturer of Intecolor. With the cooperation of Rose Printing Company, Tallahassee, Fla., the complete implementation of the process has been tested. Implementation of 27 color patterns on the 4 color press uses half tone capabilities. The invention may be practiced with higher numbers of colors, for example, color sets of 125,729 and the like. For the color sets 8 or 27 tested, direct photographs of black and white internegatives produced on the computer screen were used.

It is another object of the invention to provide method and apparatus for the color separation internegative image by the production of black and white printed images under computer control for dual additive/subtractive color models involving $(1+2^k)^3$ colors where $k=0, 1, 2 \ldots$. This has been tested by a microcomputer link to an IBM laser printer for the case $k=0$.

It is an object of the invention to eliminate curvature effects and flaws in photographing of color separation images as computer output on a printer. A compatible half tone printer can be used for color images in the 27 color system. These black and white printouts of the internegative image are then photographed to complete phase II.

The invention provides, as another object, for a multiple color system and apparatus comprising a means for reading first signals representing the data for the choice of additive colors and characters made in each position of a computer stored color graphic display.

It also provides, as an object, for generating a second set of signals representing the data needed to recreate that same display in subtractive colors by the pigment overlay process of the 4 color press, the second set of signals being then decomposed to form four additional sets of signals, one to control each of the colors cyan, magenta, yellow and black. In theory, a black press is not needed since black results from equal strength layers of magenta, yellow and cyan. In practice it is more feasible to isolate black occurances in the graphics, and print them directly on the fourth press using black ink. This cuts down ink costs and drying problems.

It is also an object of the invention to display an image representing a subtractive color resulting from a transformation of signals representing a subtractive color from signals representing additive colors.

It is an object of the invention to perform a transformation of an additive color signal to a subtractive color signal.

It is an object of the invention to perform a transformation of an additive color signal to a subtractive color signal by means of a color space.

It is a further object to improve the character registration of sequentially photographed images representing subtractive colors to be used for generating internegatives.

It is a further object of the invention to produce repetitively, internegatives representing different colors from corresponding different displays each display composed of two or more contrasting colors.

It is also an object of the invention to produce internegatives from the soft display of a cathode ray tube.

It is a further object of the invention to produce internegatives from hard copy computer output.

DETAILED DESCRIPTION

These and other objects, features and advantages of the present invention will become more apparent from the following description when taken in connection with the accompanying drawings which show, for the purposes of illustration only, one embodiment in accordance with the present invention, and wherein.

Figure 6A:
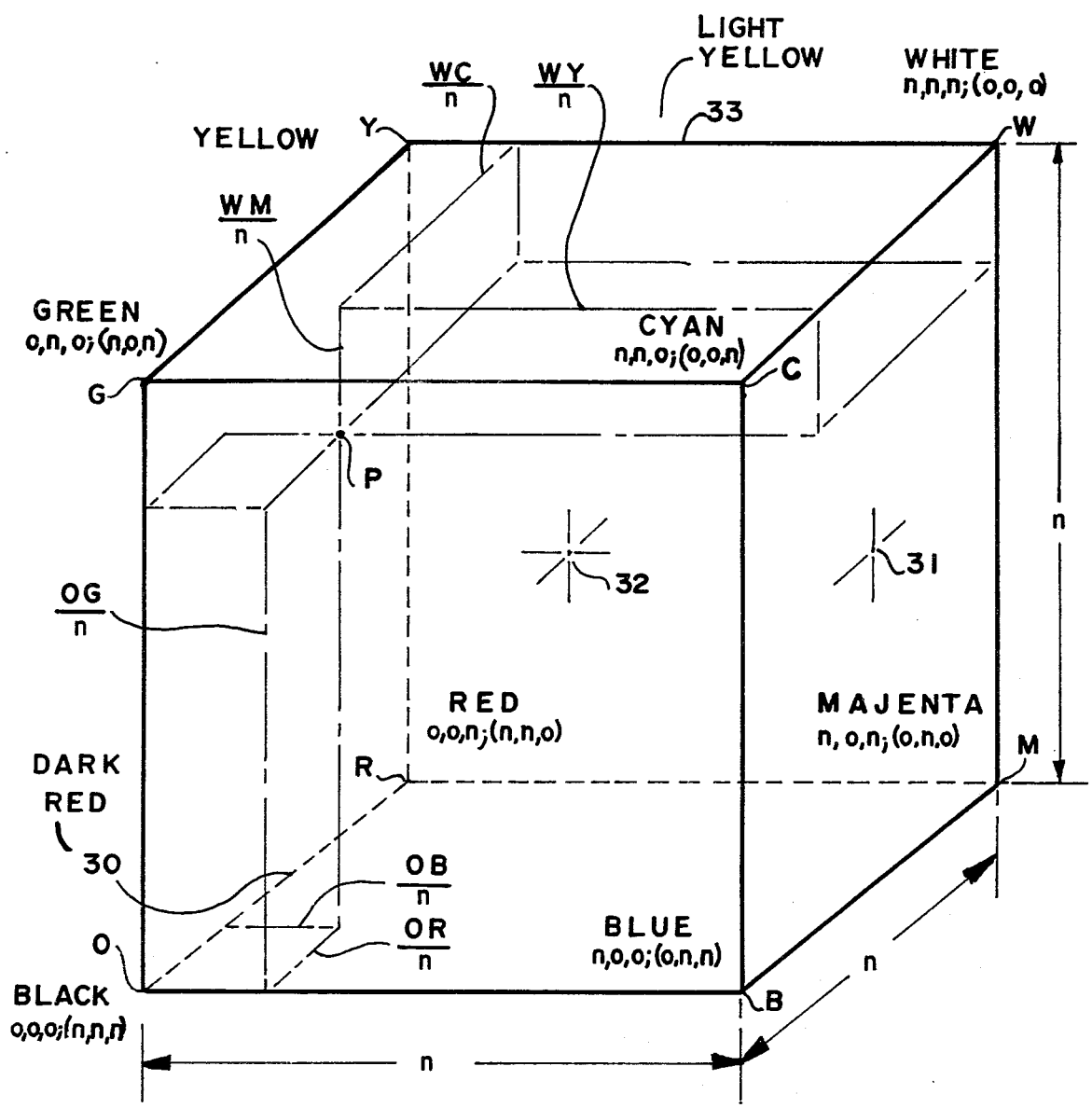

FIGS. 6A & B show schematic representations of models for color spaces employed in the discovery and practice of the invention.

FIGS. 7A and B are a flow chart describing the invention.

Reference is now made to the drawings wherein like reference numerals are used throughout the various views to designate like parts.

Figure 1:
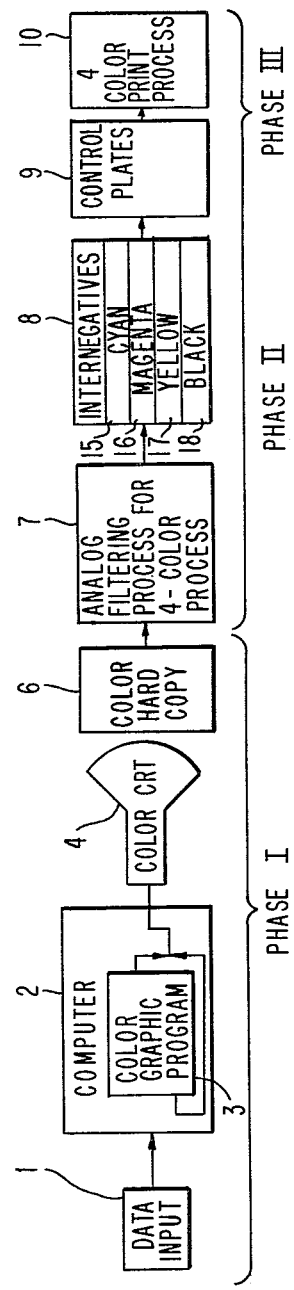
FIG. 1 shows a configuration for color reproduction according to the prior art.

FIG. 1 shows one embodiment according to a prior art configuration wherein data are input at 1 to a computer 2. The data may be employed by a color graphic program 3 to generate primary additive color data for display on a cathode ray tube 4. Alternatively, the color graphic program 3 may produce its own data without specific data input from an external source. Cathode ray tube 4 produces color graphic display which is photographed at 6 to produce a hard copy color image. By a conventional analog filter process at 7, four internegatives 15-18 are produced at 8. Control plates are produced in step 9 which are used in a four color printing process at 10.

Phase I is completed when a single hard copy color graphic output image is produced. Phase II takes this color output and, by traditional separation involving photography through filters, identifies the subtractive color components needed to print each color at the proper position. This information is transmitted to phase III in the form of black and white internegatives. These are scaled to produce control plates for the final printing in phase III.

Figure 2:
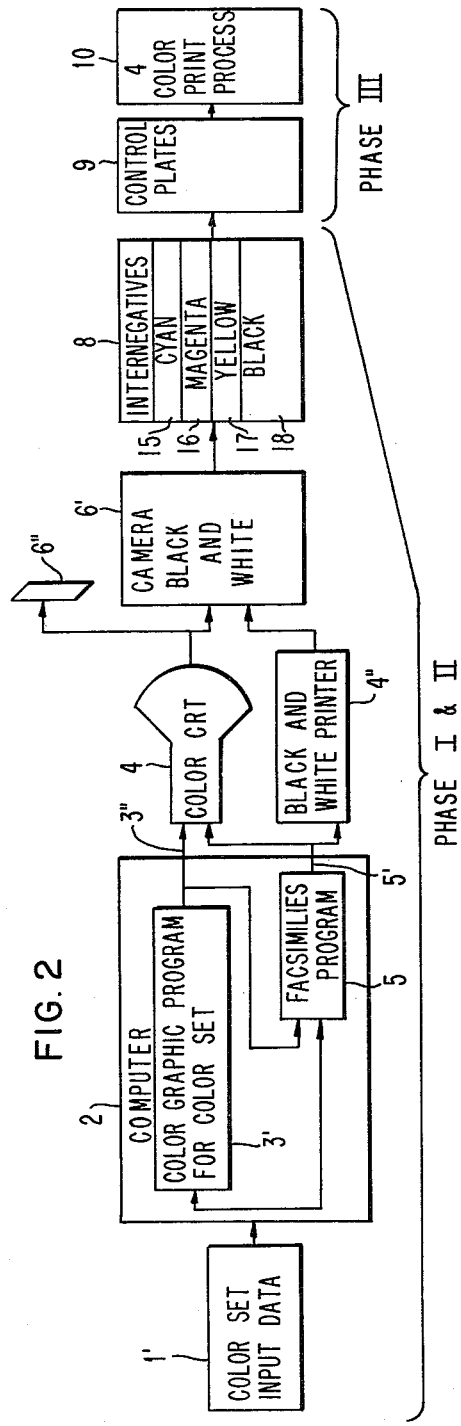
FIG. 2 shows an embodiment of the invention.

FIG. 2 shows an embodiment of the invention wherein input data from an external source 1' may be input to computer 2, the data being of a character which may be employed to generate a color graphics display with colors in the inventor's special self dual sets. The data from the external source 1' is coded according to the colors of the inventor's special self dual sets to be described below.

It will be understood that the techniques employed in generation of characters with and without alphanumeric symbols in character mode for computer display are well known.

Similarly, color signals generated by color graphic program 3' are coded according to the same special self dual sets.

The data for the color graphic display, whether input from an external source or generated by a resident color graphic program are stored in the screen memory of computer 2.

The data may find utility in any art or science wherein color graphic displays are used. Thus the data or art form may relate to the fine arts, physical sciences, mathematics, medicine, advertising copy, posters, geology, weather analysis or the like.

The improvement afforded by the invention avoids the necessity of the use of the analog filters of the prior art as shown in FIG. 1 at 7, or their equivalent. Facsimilies program 5 accepts the data generated either from input 1' or color graphic program 3' to produce signals which represent black and white images comparable to cyan, magenta, yellow and black internegatives to be produced. The output 5' of the facsimiles program 5 is displayed sequentially in black and white on the color cathode ray tube 4. The tube 4 is also capable of displaying the color image being processed.

Presentation of a color image at 4 allows the user to see images to be processed allowing interaction with the program by introduction under user control of additional or modified input at 1' or 3' to produce a modified image. The color image is photographed to produce a hard copy color image for reference file purposes, as shown schematically at 6''. Camera 6' photographs the black and white images as sequentially presented which, upon development at 8, produce the internegatives corresponding to cyan, magenta, yellow and black, 15-18.

Alternatively, the data output from facsimiles program 5 may actuate a black and white printer 4'' to produce, sequentially, images which may be photographed to produce ultimately the internegatives 15-18.

The four negatives are then employed in a four color printing process by scaling them to the desired size, and creating control plates or masks 9 for use in the cyan, magenta, yellow and black units of the press 10.

In the prior art methods, securing satisfactory registration of characters for sequentially photographed images to be used for internegatives, by physical positioning of the optical components, e.g. filters, lenses and the like, is an extremely time consuming and expensive undertaking. The resulting multicolor printed material may be lacking in the requisite registration sharpness and detail if care is not taken. By using the same CRT for both color and black and white images, under computer control, the difficulties attendant to the prior art method are avoided by the invention.

It will be appreciated that the computer/hardcopy peripheral configuration has comparable advantages as to precision of character registration and sharpness of images. While the device 4' has been described as a printer, other hard copy devices such as plotters and the like may be employed by those skilled in the art without departing from the spirit of the invention.

It will be appreciated that the invention may be employed using any combination of colors displayed which fall within the special 8 or 27 color sets to be described.

The printing process has been described in terms of three and four-color printing. A process of a different color set and number of colors may be used wherein a different number of internegatives are generated therefor. The inventor's color set models are theoretically ideal for a 3 color press where black is created by overlaying cyan, magenta and yellow. The 4 color variation meets the printer's cost and drying criteria better.

Figure 3:
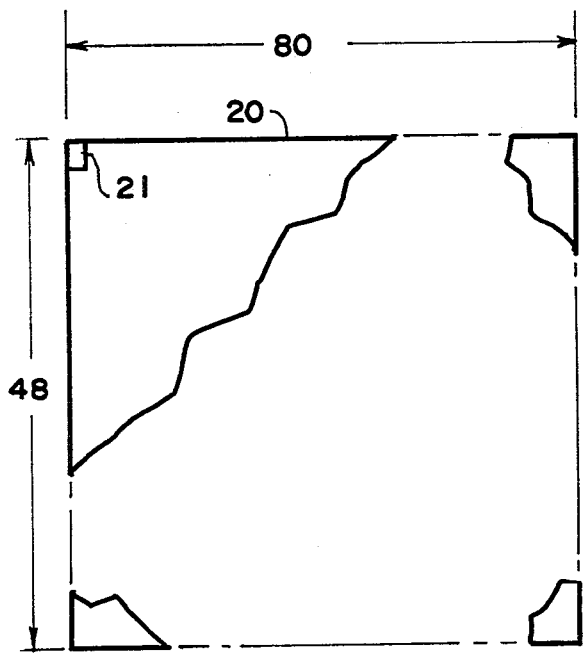
FIG. 3 shows a raster for a display for color graphics employed in connection with the invention.

Attention is now directed to FIG. 3 wherein is shown the arrangement of the color graphic image presented as input from 1' or 3' to the facsimiles program 5 and to CRT 4.

It will be appreciated by those skilled in the art that the color graphic image may take one of many forms and that the particular configuration shown in FIG. 3 is exemplary only.

As there shown, the data, in character mode, are arrayed rectangularly, 80 characters to a horizontal line, and vertically with 48 lines. A single character is shown at 21. Character 21 is composed of two colors of the special 8 color set to be described, one color constituting foreground, the second background. The data for each character is composed of a multiplicity of elements of data. Each element of data, is characterized by numerical values representing its coordinate position, both horizontally and vertically in the raster, its character type, that is, two sets of three numerical values representing the presence levels or absence of each of the primary additive colors, red, green and blue, as distributed respectively in the background and foreground components of the character. The information for each of the data elements is read from the computer's screen memory for processing by the facsimiles program 5 of FIG. 2 which performs a scan and analysis of the color data for each character 21.

Figure 4:
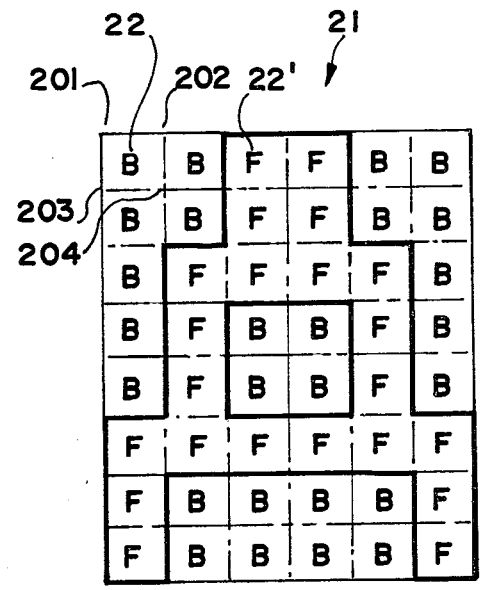
FIG. 4 shows the details of a single character with alphanumeric symbol employed in the raster of FIG. 3.

FIG. 4 shows the details of a single character 21 divided into 48 light sources 22 a light source 22 being bounded by the four corners 201, 202, 203 and 204, arranged 6 in each horizontal row and in 8 rows vertically in a rectangular configuration. The alphanumerical symbol within the character being displayed determines by its configuration or shape which of the 48 light sources are displaying the selected background color and which selected foreground color, from the basic 8 color set. Only two colors are allowed in a single character. Thus, as shown in FIG. 4, a symbol such as A may be shown in one color by actuating a configuration of light sources such as 22' in one color as foreground, designated in the figure as F, while the remaining light sources 22 are actuated in another color as a background configuration, designated in the figure as B.

Figure 5A:
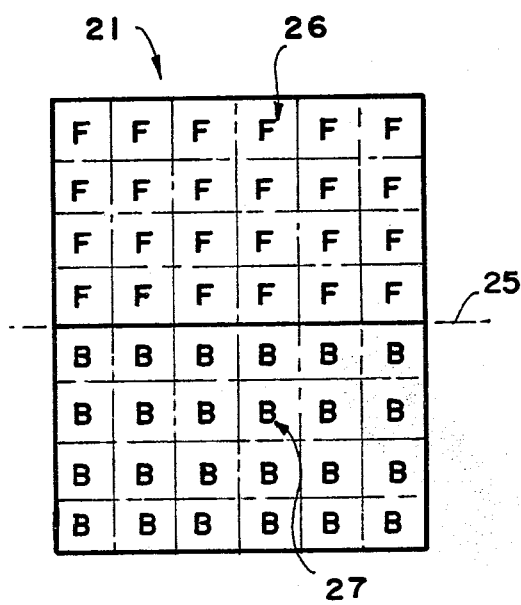
FIG. 5A shows a character employing foreground in a half character and background in the remaining half character.

Greater image detail may be achieved for displays with no alphanumerical characters as shown in FIG. 5A, wherein a character is divided in two at line 25 to produce half characters 26 and 27. The light sources 26 of the upper half the character are actuated by the program of the computer to produce one color, designated for example, as foreground, while the light sources of the lower portion of the character, below line 25, are actuated for a second color, designated in the figure for example, as background.

Figure 5B:
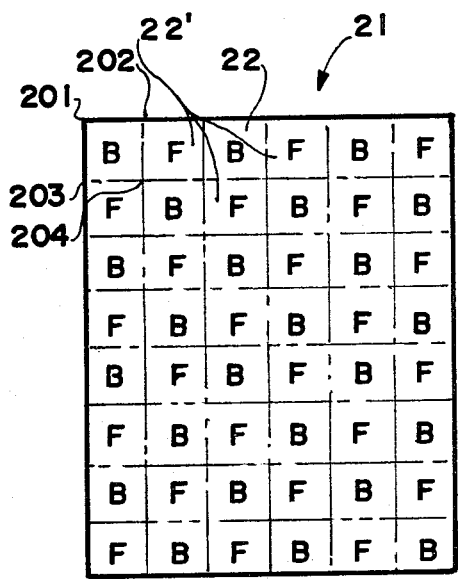
FIG. 5B shows details of the data points within a character employing pointillism for foreground and background.

The inventor has increased the color resolution in the 8 color set as shown in FIG. 5B. This figure shows a special character designed by the inventor to extend 8 color generation by the light sources to produce 27 colors for use in presenting non-alphanumeric characters. In this character, background and foreground colors are assigned to light sources, such as that bounded by 201, 202, 203 and 204, in checkerboard configuration. By actuating the pointillism key, as will be explained, the computer program causes the character generators and attendant causes circuitry to produce the checkerboard configuration of background and foreground colors. Thus, while the light source 22, bounded by 201, 202, 203 and 204, is assigned a background color, its adjacent light sources 22' will be foreground color. To display a non-alphanumeric character, for example, a rectangle 21, selected light sources such as 22 will be actuated to display red as background while the adjacent light sources 22' are actuated to display yellow. The effect as seen by the eye of the red and yellow combination is an orange rectangle.

It will be observed, however, that to produce the intermediate color thereby increasing color resolution, spatial resolution has been reduced since the character 21 is incapable in this mode of displaying individual symbols within its rectangle, but displays what is seen by the eye as an area having a single color.

The Intecolor 8051 is capable of producing the light source configurations shown in FIGS. 4, 5A and 5B.

The invention has been described using a rectangular character as an example, as shown in FIGS. 3, 4 5A and 5B. It will be apparent to those skilled in the art that other character shapes may be employed, for example, squares, and the like, without departing from the spirit of the invention.

The purpose of the facsimiles program 5 is to reconstitute the numerical data representing the primary additive color graphics image in terms of the primary subtractive color pigments used for printing. For this purpose, attention is directed to FIG. 6A which shows a color solid in the form of a cube wherein colors are assigned to all points with integer coordinates on or inside the cube of sides of dimension n from the 8 vertex assignments.

Thus, black is designated 0, o,o,o; red is R, o, o, n; green is G, o, n, o; blue is B, n,o,o; yellow is Y, o,n,n; magenta is M, n,o,n; cyan is C, n,n,o; and white is W, n,n,n. This is a color model involving $n=(1+2^k)^3$ colors for $k=0,1,2, \ldots$. For $k=0$, this supplies an 8 color system compatible with the normal output colors in graphics systems such as character mode color graphs produced on Intecolor 8000 series standard equipment, which equipment is widely used. For $k=1$, the 27 color system for solid character colors used by the inventor is also compatible.

Let us take a close look at the $k=0$, $n=1$, 8 color version of the cubic dual model, FIG. 6A, which applies to many color graphics outputs needing color separation for subtractive printing processes. The colors of the cube's eight vertices have coordinates corresponding in order B,G,R to the Boolean (on-off) conditions of the Blue, Green and Red light guns which produce them as additive light patterns on the CRT.

Associated with each color is a decimal number determined by treating its B,G,R expansion as a binary number. Each color in the 8 has a unique complementary color with coordinates 1-B, 1-G, and 1-R, respectively. As binary numbers, these complementary numbers are said to be ones complements of each other. The decimal interpretation of these eight color positions causes the sum of the decimal numbers to be 7 in each complementary pair. These facts are displayed in tabular form below.

TABLE I

| Decimal Form | Binary Additive | Color | Complement | Complement Binary | Decimal Form |
|---|---|---|---|---|---|
| 0 | 000 | Black | White | 111 | 7 |
| 1 | 001 | Red | Cyan | 110 | 6 |
| 2 | 010 | Green | Magenta | 101 | 5 |
| 3 | 011 | Yellow | Blue | 100 | 4 |
| 4 | 100 | Blue | Yellow | 011 | 3 |
| 5 | 101 | Magenta | Green | 010 | 2 |
| 6 | 110 | Cyan | Red | 001 | 1 |
| 7 | 111 | White | Black | 000 | 0 |
| | BGR | | | YMC | |

TABLE I-continued

| Decimal Form | Binary Additive | Color | Complement | Complement Binary | Decimal Form |
|---|---|---|---|---|---|
| ADDITIVE | | | | SUBTRACTIVE | |

The last lines of the table summarize an important part of the 8 color process. For each color B,G, R in an additive pattern we can produce that color in a subtractive pattern replication at the same position if we use the binary coding of its complement as the Boolean command for subtractive combinations of its subtractive primaries yellow, magenta and cyan.

In FIG. 6A, a notation convention is adopted wherein coordinates measured from the black origin 0 are designated without parenthesis while coordinates measured from the white origin W are enclosed in parenthesis.

The phrase "self dual" will thus be understood in the context of the disclosure as referring to the fact that colors may be dually referenced with respect to the two origins, 0 for black and W for white of the (self) same color space.

For pure color half character, the process operates using k=0 and the above 8 colors, at a resolution of 96×80, however the special character employed to extend the system to accomodate 27 colors, for the case k=1, drops the spatial resolution back to 48×80. On the inventor's equipment, Intecolor 8054, the "delete" key of the standard keyboard was modified as the special pointillism character K. Activation of the pointillism character key serves to cause the program to generate digitally coded signals for combinations of the additive primary colors applied in three modes, (null, ½ strength or full strength) according to a cube as shown in FIG. 6A with k=1, n=2, and 27 color positions in a 3×3×3 array. The eight basic colors are now at the vertices with components of magnitude twice as large as before. Because of the three-choice logic, base 3 arithmetic is used to convert the coordinates (black, 000 to white 222) to decimal numbers 0, 1, . . . 26. The nineteen new colors added occupy all midpoints determined by the 8 cube corners, with integer coordinates such as 30 and the center of the cube at 32, providing a total of 27 color positions on the cube.

The additional colors are then designated by pointillism midpoint interpolation. In a system where $n=2^k$ and k=1, then n=2 and, as shown on the cube, intermediate colors may be represented such as dark red at a mid-point between black and red, shown at point 30, having a coordinate assignment o,o,1 the mid-point of OR. Light yellow, in the configuration described, is shown as mid-point 33 between Y and W at a point 1, 2, 2. For a point P, the proportions are determined by the co-efficients in the expansion of the vector OP in terms of unit vectors OR/n, OG/n and OB/n. As we will see below, for k=2,n=4, point P in FIG. 6A would have additive vector components 1,3,1 and subtractive components (3,1,3).

The complement coordinates give the levels of cyan, magenta and yellow needed to produce the color from a 3 color press. As seen from FIG. 6A, where k=1, and n=2, complementary colors relate to each other numerically as two's complements. The decimal order, i.e. number of colors for a cube of n=2, 0,1,2 . . . 26, produces a total of 27 colors.

Figure 6B:
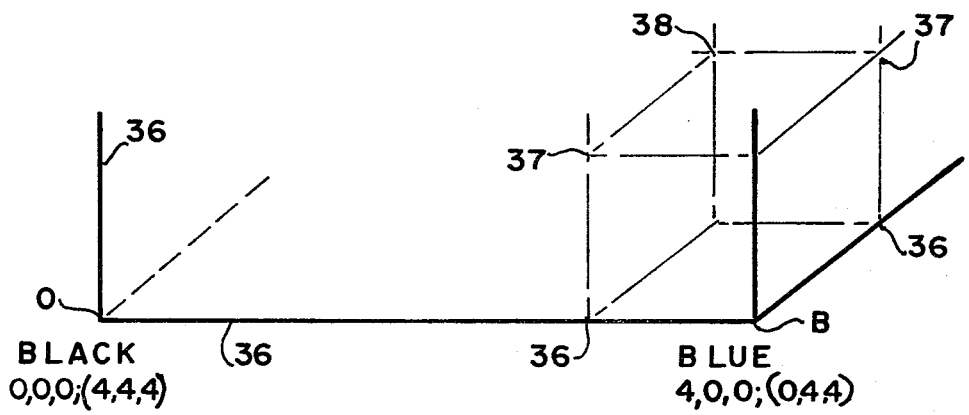

In an extension of the system for k=2, the color solid is divided as shown in FIG. 6B so that further intermediate points with integer coordinates or components such as 36 for the cube edges, 37 on the surfaces of the cube and 38 interior to the cube are provided, for a total of 125 points for additive color designation. Thus, a digital designation for point 38 in additive colors would be 3, 1, 1. The mathematical theory for the 125 color model gives point 38 the base 5 interpretation $311_5=81_{10}$; its complement $133_5=43_{10}$. Color separation for such patterns can be done on a press capable of printing quarter tones. By further division, color models with larger numbers of colors may be employed e.g., color models with 729 colors.

As visualized in the color solid of FIG. 6A, in the K=0(8 color case), cyan as viewed from the additive origin 0, black, has coordinates 110. Viewed from the subtractive origin W, white, the cyan signal has coordinates (001). Thus, following the convention used here of representing additive coordinates for the color solid without parenthesis and for enclosing coordinates viewed from the subtractive origins in preenthesis, subtractive color signals are available as (100) for yellow, (010) for magenta, (000) for white, (111) for black, (011) for blue, (101) for green and (110) for red.

As previously described, subtractive color data may be extracted from the color solid shown in FIG. 6 by performing a transformation wherein the origin is established at point W of the figure. For this purpose, the computer 2 of FIG. 2 scans the additive color data in screen memory and performs a logical inversion of the additive color signals for its background and foreground to produce the subtractive color signals of the cooresponding coordinate location. The coded signals representing subtractive colors resulting from the inversion are produced as outputs.

While the computer transformation is disclosed, from additive to subtractive colors, by means of the color solid shown in FIGS. 6A and B, those skilled in the art will understand that the transformation may employ a different color space wherein additive colors are assigned a numerical designation from which numerical designations in terms of subtractive colors are derived.

The computer stores such outputs, the subtractive color data, for subsequent processing. At this point, it will be understood that the computer now has the data for each data element coordinate location together with the corresponding subtractive color data.

The facsimiles program 5 is now ready to generate signals representing the presence of a single particular primary subtractive color which will be used to produce an internegative for that color as it occurs in the background or foreground of each subtractive data set from an additive color character.

Thus, for example, if it is desired to produce a cyan internegative, the computer scans the subtractive color data store, for each datum location within a raster, in an attempt to match the data there stored against the subtractive color coordinate code for the particular color to be used for an internegative. For the example given, the code (001) for cyan will be used to perform the matching operation. When a match is achieved, for a particular coordinate position in the raster, an output signal is generated which is stored. Thus, for the example given, after the scanning of the subtractive data for a raster for cyan employing (001), there will be stored in the computer a raster of data for those points of the raster identified as having a cyan code.

The data for a particular subtractive primary color as identified by the scanning process having been stored in memory, the scanning and storing process is repeated for the other two subtractive primary colors for which internegatives are needed in the ideal 3 color pigment process.

For a conventional four color process, scanning and storing data for subtractive colors, cyan, magenta, yellow and black will be performed with all black separations for foreground and background done first and the other colors treated as above.

With the storing of data of the subtractive colors completed, the program now displays, as output, the data representing a single subtractive primary color on a black and white display of FIG. 2. The display may take a variety of forms, for example, the image may be presented on a black and white cathode ray tube as a soft display on CRT 4 or, alternatively, the display may be represented on a black printer as shown at 4" if it has a character set compatible to the color display of the CRT on the computer. Characteristically the CRT may be a color CRT capable of displaying the color image being analyzed as well as the black and white image.

The display 4 and/or 4" is photographed by camera 6' in black and white and the resulting negative is the desired internegative for the subtractive color required.

Upon completing the photographing of the display for a first color, the scanning, displaying, photographing and developing steps are repeated for as many internegatives 15–18 as are required for the color printing process being employed.

FIGS. 7A and B are a flow chart disclosing the steps of the method employed for the apparatus of the invention. The process starts at 101 wherein additive color data representing an image is input to the computer from a source external to the computer. Alternatively, such data may be generated within the computer by a color graphic program as shown at 102. As previously indicated, the data represents those colors present from the colors of the special self dual sets described in connection with FIG. 6. For each coordinate position in the raster, two sets of three numerical values representing the presence levels or absence of each of the primary additive colors, red, green and blue, in the background and foreground of the components of the character are presented. Raster images are thus automatically presented to the computer. The data so input represent a raster of the image in character mode at 103, which data is stored in the computer at 103A. The additive color data stored is scanned, as shown by 104, by the facsimiles program 5 and, for each data point in an image raster, a digital code signal is generated indicating the presence level of each primary additive color, red, green and blue, as shown at 105, in its background and foreground components. For each character, background and foreground, it is determined at 106, from the color generated additively on the screen whether black is present for a 4 color press, and how that (R,G,B) color could be produced subtractively as used for pigments in levels (C,M,Y) on a three color press.

The signals so produced are transformed, at 120, FIG. 6B, by logical operations in the computer to produce digital code signals representing subtractive colors needed in pigment printing which are stored in the computer, at 121, so that the data are represented in raster form, character mode, in terms of primary subtractive colors for the 3 color system, and black additionally for a 4 color press version.

The stored data representing subtractive colors are scanned, at 122, to generate output signals representing a single subtractive primary color and, for a four color press, black. Such an output may be, for example, the data signals representing cyan in the subtractive form.

As scanned, such output signals may be stored in the computer as a raster for a single subtractive color (and-/or black) for future output to a peripheral or, alternatively, immediately they may be output to the peripheral.

The display peripheral may be one or more of a sequential soft display of a black and white signal on the color cathode ray tube at 124 or a sequential hard display of the black and white signal on a compatible printer shown at 123.

A photograph is taken of the black and white image displayed for each subtractive primary (and black if 4 color) either in soft or hard display as shown at 125. When the computer is caused by its program to sequentially present for display the data representing each of 3 subtractive primary colors (and black), and each is photographed and developed as shown at 125 and 126, steps comparable to phases I and II of the prior art process of FIG. 1, but with considerable savings in time and money.

The internegatives so produced and developed at 126 are then used in the same phase III multicolor print process as shown at step 127 to produce scaled control plates with which the color printing process is carried out.

The following pages present program listing for two computer programs employed in connection with the invention. Program listing 1 is an exemplary color graphic program which may be used as element 3 of FIG. 2 while program listing 2 may be used for the facsimiles program 5 of FIG. 2. These programs have been implemented upon an Intecolor 8054 computer. The Intecolor 8000 computers, available from the manufacturer indicated above accomodates the special pointillism character described above in connection with FIG. 5. Thus with the color graph and facsimiles programs loaded in such an Intecolor 8000, the artisan may generate the desired CRT color image to be printed and the series of black and white images used to generate internegatives as described above.

EXEMPLARY COLOR GRAPHICS PROGRAM

```
PROGRAM CLR11
INTEGER ILINE(78)
INTEGER COLOR
LOGICAL FG(27),BG(27),CHAR,L1,L2,L3,L4,L5,L6,L7,L8,L9,IX,IY
+,L10,NEWCLR(27),L11
COMMON//IPFIX(80),VALUE(41)
CALL OPEN(6,'TABLE.DAT ')
```

```
      REWIND 6
      READ(6,FPR=102,END=102)IFFIX,VALUE
      ENDFILE 6.
5     CONTINUE
      GO TO 1001
102   WRITE(1,121)
121   FORMAT(' ERROR:   PROBLEMS WITH DATA FILE... ')
      STOP
1001  CONTINUE
C
      CHAR=127
      FG(1)=16
      BG(1)=16
      FG(2)=16
      BG(2)=17
      FG(3)=17
      BG(3)=17
      FG(4)=16
      BG(4)=18
      FG(5)=17
      BG(5)=18
      FG(6)=17
      BG(6)=19
      FG(7)=18
      BG(7)=18
      FG(8)=18
      BG(8)=19
      FG(9)=19
      BG(9)=19
      FG(10)=16
      BG(10)=20
      FG(11)=17
      BG(11)=20
      BG(12)=17
      FG(12)=21
      FG(13)=18
      BG(13)=20
      FG(14)=21
      BG(14)=18
      FG(15)=19
      BG(15)=21
      FG(16)=18
      BG(16)=22
      FG(17)=19
      BG(17)=22
      FG(18)=19
      BG(18)=23
      FG(19)=20
      BG(19)=20
      FG(20)=20
      BG(20)=21
      FG(21)=21
      BG(21)=21
      FG(22)=22
      BG(22)=22
      FG(23)=20
      BG(23)=23
      FG(24)=21
      BG(24)=23
      FG(25)=22
      BG(25)=22
```

```
      FG(26)=23
      BG(26)=22
      FG(27)=23
      BG(27)=23
      L1=19
      L2=16
      L3=3
      L4=27
      L5=29
      L6=30
      L7=15
      L8=14
      L9=18
      L10=88
      L11=28
      WRITE(1,1010)L1,L4,L10,L7,L9
1010  FORMAT('1',1X,4A1,'ENTER THE MIDDLE VALUE FOR X ',1A1)
      READ(3,1015)MIDX
1015  FORMAT(I3)
      WRITE(1,1030)L1,L9
1030  FORMAT(/,1X,1A1,'ENTER THE MIDDLE VALUE FOR Y ',1A1)
      READ(3,1015)MIDY
      WRITE(1,1040)L1,L9
1040  FORMAT(/,1X,1A1,'DO YOU WANT TO CHANGE THE COLOR CODE? ',1A1)
      READ(3,1042)IANS
1042  FORMAT(1A2)
      IF ((IANS .EQ. 'N ') .OR. (IANS .EQ. 'NO'))GOTO 200
      IX=35
      IY=1
      WRITE(3,1)L3,IX,IY
   1  FORMAT('1',3A1,'COLOR CODE')
      DO 4 K=1,27
      IX=2*(K-1)+13
      IY=5
      KK=K-1
      WRITE(3,2)L6,L2,L5,L9,L3,IX,IY,KK,L6,BG(K),L5,FG(K)
   2  FORMAT(' ',7A1,I2,4A1)
      DO 4 J=1,3
      IY=1+J
      WRITE(3,3)L3,IX,IY,CHAR,CHAR
   3  FORMAT(' ',5A1)
   4  CONTINUE
      IX=0
      IY=7
1043  WRITE(1,1044)L6,L2,L3,IX,IY,L5,L1,L11,L9
1044  FORMAT(' ',7A1,'ENTER THE NEW COLOR ORDER ',/,
     +' 0001020304050607080910111213141516171819202122232425226',
     +,/,' ',2A1)
      READ(3,1046)NEWCLR
1046  FORMAT(27I2)
      DO 1050 I=1,27
      IF ((NEWCLR(I) .LT. 0) .OR. (NEWCLR(I) .GT. 26))GOTO 1043
1050  CONTINUE
      GOTO 220
 200  DO 210 I=1,27
      NEWCLR(I)=I-1
 210  CONTINUE
 220  Y=FLOAT(MIDY+20)
      WRITE(1,1081)
1081  FORMAT('1')
      DO 2000
```

```
          X = FLOAT  (MIDX-30)
          IX=10
          IY=J+2
          DO 2001 I=1,61    (X= FLOAT(MIDX-30))
          IERR=0              IX=10
          CALL EVAL(X,Y,RESULT,IERR)   IY=J+2
          NUM=MOD(MOD(INT(RESULT),27)+27,27)+1
          COLOR=NEWCLR(NUM)+1
          WRITE(1,3000)L3,IX,IY,LF,FG(COLOR),LF,FG(COLOR),CHAR
3000      FORMAT(' ',9A1)
          X=X+1.0
          IX=IX+1
2001      CONTINUE
          Y=Y-1.0
2002      CONTINUE
          MINY=MIDY-20
          MAXY=MIDY+20
          MINX=MIDX-30
          MAXX=MIDY+30
          IX=2
          IY=44
          I1=23
          ENDFILE 3
          CALL OPEN(7,'FUNCT.DAT ')
          REWIND 7
          READ(7,END=2121,ERR=100)ILINE
2121      CONTINUE
          ENDFILE 7
          WRITE(1,2003)L6,L2,LF,L1
2003      FORMAT(' ',4A1)
          WRITE(1,2022)L3,IX,IY,MINX,MAXX,MINY,MAXY,NEWCLR,ILINE
2022      FORMAT(' ',3A1,'X-VALUES ARE ',I3,' TO ',I3,
         +'      Y-VALUES ARE ',I3,' TO ',I3,/
         +,' COLORS ARE ',28(I2,1X),I2,/,' ',7FA1)
          END
C
C
C
          SUBROUTINE EVAL(X,Y,RESULT,ERROR)
C
C  THIS SUBROUTINE EVALUATES THE POSTFIX STACK CREATED BY COMP
C
          LOGICAL MESAGE
          INTEGER PFIX,PTOP,FTOP,ERROR
          DIMENSION EVSTAK(41)
          COMMON//PFIX(80),VALUE(41)
C
C  STATEMENT FUNCTION TO BE USED BY ARC FUNCTIONS...
C
          ARG(A)=A/SQRT(1-A**2)
          TAN(A)=SIN(A)/COS(A)
          VALUE(1)=X
          VALUE(2)=Y
          VALUE(3)=3.1415926535898
          FTOP=0
          UBOUND=87.0
          PTOP=0
          MESAGE=.TRUE.
          IF(ERROR .GT. 0)MESAGE=.FALSE.
          ERROR=0
```

```
C
1       CONTINUE
        PTOP=PTOP+1
        JMPNUM=PFIX(PTOP)
        GOTO(15,20,30,40,50,60,70,80,90,100,110,120,130,140,
       -150,1,170,180),JMPNUM
        IF(PFIX(PTOP) .LT. 0)GOTO 1000
C       COME HERE IF ITEM IS A VARIABLE OR CONSTANT (ALL CAPS)
        INDEX=PFIX(PTOP)-99
        ETOP=ETOP+1
        EVSTAK(ETOP)=VALUE(INDEX)
        GOTO 1
15      CONTINUE
C                                       EXPONENTIATION
        ETOP=ETOP-1
        IF((EVSTAK(ETOP) .NE. 0) .OR. (EVSTAK(ETOP+1) .GT. 0))GOTO 17
        IF(EVSTAK(ETOP+1) .EQ. 0)GOTO 1010
        GOTO 1009
17      CONTINUE
        EVSTAK(ETOP)=EVSTAK(ETOP)**EVSTAK(ETOP+1)
        GOTO 1
20      CONTINUE
C                                       MULTIPLICATION
        ETOP=ETOP-1
        EVSTAK(ETOP)=EVSTAK(ETOP)*EVSTAK(ETOP+1)
        GOTO 1
30      CONTINUE
C                                       DIVISION
        IF(EVSTAK(ETOP) .EQ. 0)GOTO 1007
        ETOP=ETOP-1
        EVSTAK(ETOP)=EVSTAK(ETOP)/EVSTAK(ETOP+1)
        GOTO 1
40      CONTINUE
C                                       ADDITION
        ETOP=ETOP-1
        EVSTAK(ETOP)=EVSTAK(ETOP)+EVSTAK(ETOP+1)
        GOTO 1
50      CONTINUE
C                                       SUBTRACTION
        ETOP=ETOP-1
        EVSTAK(ETOP)=EVSTAK(ETOP)-EVSTAK(ETOP+1)
        GOTO 1
60      CONTINUE
C                                       NEGATION
        EVSTAK(ETOP)=-EVSTAK(ETOP)
        GOTO 1
70      CONTINUE
C                                       SINE
        EVSTAK(ETOP)=SIN(EVSTAK(ETOP))
        GOTO 1
80      CONTINUE
C                                       COSINE
        EVSTAK(ETOP)=COS(EVSTAK(ETOP))
        GOTO 1
90      CONTINUE
C                                       TANGENT
        EVSTAK(ETOP)=TAN(EVSTAK(ETOP))
        GOTO 1
100     CONTINUE
```

```
C                          ARCSINE
      IF(EVSTAK(ETOP) .GT. 1)GOTO 1011
      EVSTAK(ETOP)=ATAN(ARG(EVSTAK(ETOP)))
      GOTO 1
 110  CONTINUE
C                          ARCCOSINE
      IF(EVSTAK(ETOP) .GT. 1)GOTO 1011
      EVSTAK(ETOP)=VALUE(3)/2.0-ATAN(ARG(EVSTAK(ETOP)))
      GOTO 1
 120  CONTINUE
C                          ARCTANGENT
      IF(EVSTAK(ETOP) .GE. 1) GOTO 1011
      EVSTAK(ETOP)=ATAN(EVSTAK(ETOP))
      GO TO 1
 130  CONTINUE
C                          ABSOLUTE POWER
      EVSTAK(ETOP)=ABS(EVSTAK(ETOP))
      GOTO 1
 140  CONTINUE
C                          EXP FUNCTION    (E**A)
      IF(EVSTAK(ETOP) .GT. UPOUND)GOTO 1036
      EVSTAK(ETOP)=EXP(EVSTAK(ETOP))
      GOTO 1
 150  CONTINUE
C                          NATURAL LOGARITHM
      IF(EVSTAK(ETOP) .LE. 0)GOTO 1012
      EVSTAK(ETOP)=ALOG(EVSTAK(ETOP))
      GOTO 1
 170  CONTINUE
C                          MODULUS FUNCTION
      IF(EVSTAK(ETOP) .EQ. 0.0)GOTO 1013
      ETOP=ETOP-1
      EVSTAK(ETOP)=AMOD(EVSTAK(ETOP),EVSTAK(ETOP+1))
      GOTO 1
 180  CONTINUE
C                          INT FUNCTION
      EVSTAK(ETOP)=INT(EVSTAK(ETOP))
 1000 CONTINUE
C
C     COME HERE FOR NORMAL TERMINATION OF THE SUBROUTINE
C
      RESULT=EVSTAK(ETOP)
      RETURN
C
C
C        ERROR MESSAGES...
C
 1011 CONTINUE
      IF(MESAGE)WRITE(1,880)
 880  FORMAT(' ERROR: DATA FILE PROBLEMS...')
      ERROR=-1
      RETURN
 1006 CONTINUE
```

```
C                          EXPRESSION OUT OF BOUNDS
      ERROR=6
      IF(MESAGE)WRITE(1,906)
      RETURN
 1007 CONTINUE
C                          DIVISION BY ZERO
      ERROR=7
      IF(MESAGE)WRITE(1,907)
      RETURN
 1008 CONTINUE
C                          NEGATIVE TO A POWER
      ERROR=8
      IF(MESAGE)WRITE(1,908)
      RETURN
 1009 CONTINUE
C                          ZERO TO A NEGATIVE POWER
      ERROR=9
      IF(MESAGE)WRITE(1,909)
      RETURN
 1010 CONTINUE
C                          ZERO TO THE ZERO POWER
      ERROR=10
      IF(MESAGE)WRITE(1,910)
      RETURN
 1011 CONTINUE
C     ILLEGAL OPERATION
      ERROR=11
      IF(MESAGE)WRITE(1,911)
      RETURN
 1012 CONTINUE
C                          ARGUMENT FOR LN IS < OR = 0
      ERROR=12
      IF(MESAGE)WRITE(1,912)
      RETURN
 1013 CONTINUE
C                          MOD BY ZERO
      ERROR=13
      IF(MESAGE)WRITE(1,913)
      RETURN
  906 FORMAT(' ERROR: EXPRESSION OUT OF BOUNDS')
  907 FORMAT(' ERROR: DIVISION BY ZERO')
  908 FORMAT(' ERROR: NEGATIVE TO A POWER')
  909 FORMAT(' ERROR: ZERO TO A NEGATIVE POWER')
  910 FORMAT(' ERROR: ZERO TO THE ZERO POWER')
  911 FORMAT(' ERROR: ILLEGAL OPERAND FOR ARC FUNCTION')
  912 FORMAT(' ERROR: ARGUMENT FOR LN IS LESS THAN OR EQUAL ZERO')
  913 FORMAT(' ERROR: MODULUS IS ZERO')
      END
```

FACSIMILES PROGRAM

```
      LOGICAL COLOR(80,48),FG,BG,PLOT
     *,CLR,L1,L2,L3,L4,L5,L6,L7,L8
      INTEGER CORNER
      CORNER=32700
C
C
 1000 L1=3
      L2=0
      L3=11
      L4=10
      WRITE(1,10)L1,L2,L2,L3,L4,L3
```

```
 10 FORMAT(' ',6A1)
 30 IMIN=1
    IMAX=80
    JMIN=3
    JMAX=48
C SAVE THE COLORS FOR THE GRAPH
C
 50 DO 60 J=JMIN,JMAX
    DO 60 I=IMIN,IMAX
 55 COLOR(I,J)=PEEK(CORNER+2*(I-1)+160*(J-1)+69)
 60 CONTINUE
 70 DO 80 I=IMIN,IMAX
    DO 80 J=JMIN,JMAX
    CLR=COLOR(I,J)
    FG=0
    BG=0
    IF(CLR .LT. 0)GOTO 72
    IF((CLR .AND. Z'20') .EQ. 0) BG=Z'38'
    IF((CLR .AND. Z'04') .EQ. 0) FG=Z'07'
    CLR=FG .OR. BG
    GOTO 75
 72 CLR=Z'3F' .AND. CLR
    IF((CLR .AND. Z'20') .EQ. 0) BG=Z'38'
    IF((CLR .AND. Z'04') .EQ. 0) FG=Z'07'
    CLR=Z'80' .OR. FG .OR. BG
 75 CALL POKE(CORNER+2*(I-1)+160*(J-1)+69,CLR)
 80 CONTINUE
    L1=3
    L2=35
    L3=0
    L4=14
    L5=23
    WRITE(1,90)L1,L2,L3,L4,L5
 90 FORMAT(' ',5A1,'YELLOW ')
    READ(3,100,ERR=110,END=110)K
100 FORMAT(A2)
110 DO 120 I=IMIN,IMAX
    DO 120 J=JMIN,JMAX
    CLR=COLOR(I,J)
    FG=0
    BG=0
    IF(CLR .LT. 0)GOTO 112
    IF((CLR .AND. Z'10') .EQ. 0) BG=Z'38'
    IF((CLR .AND. Z'02') .EQ. 0) FG=Z'07'
    CLR=FG .OR. BG
    GOTO 115
112 CLR=Z'3F' .AND. CLR
    IF((CLR .AND. Z'10') .EQ. 0) BG=Z'38'
    IF((CLR .AND. Z'02') .EQ. 0) FG=Z'07'
    CLR=Z'80' .OR. FG .OR. BG
115 CALL POKE(CORNER+2*(I-1)+160*(J-1)+69,CLR)
120 CONTINUE
    WRITE(1,130)L1,L2,L3
130 FORMAT(' ',3A1,'MAGENTA ')
    READ(3,140,ERR=150,END=110)K
140 FORMAT(A2)
150 DO 160 I=IMIN,IMAX
    DO 160 J=JMIN,JMAX
    CLR=COLOR(I,J)
    FG=0
    BG=0
    IF(CLR .LT. 0)GOTO 152
    IF((CLR .AND. Z'08') .EQ. 0) BG=Z'38'
    IF((CLR .AND. Z'01') .EQ. 0) FG=Z'07'
    CLR=FG .OR. BG
    GOTO 155
152 CLR=Z'3F' .AND. CLR
    IF((CLR .AND. Z'08') .EQ. 0) BG=Z'38'
    IF((CLR .AND. Z'01') .EQ. 0) FG=Z'07'
    CLR=Z'80' .OR. FG .OR. BG
155 CALL POKE(CORNER+2*(I-1)+160*(J-1)+69,CLR)
160 CONTINUE
    WRITE(1,170)L1,L2,L3
170 FORMAT(' ',3A1,'CYAN    ')
    READ(3,140,ERR=150,END=110)K
180 DO 190 I=IMIN,IMAX
    DO 190 J=JMIN,JMAX
    CLR=COLOR(I,J)
    FG=0
    BG=0
    IF(CLR .LT. 0)GOTO 182
    IF((CLR .AND. Z'38') .EQ. 0) BG=Z'3F'
    IF((CLR .AND. Z'07') .EQ. 0) FG=Z'07'
    CLR=FG .OR. BG
    GOTO 185
182 CLR=Z'3F' .AND. CLR
    IF((CLR .AND. Z'38') .EQ. 0) BG=Z'38'
    IF((CLR .AND. Z'07') .EQ. 0) FG=Z'07'
    CLR=Z'80' .OR. FG .OR. BG
185 CALL POKE(CORNER+2*(I-1)+160*(J-1)+69,CLR)
190 CONTINUE
    L5=15
    L4=17
    WRITE(1,200)L1,L2,L3,L5,L4
200 FORMAT(' ',3A1,'BLACK       ',2A1)
    READ(3,140)K
    END
```

It will be apparent to those skilled in the art that the invention is not limited to a particular configuration of computer or photographic equipment but may be implemented upon other configurations. Similarly, the program is not limited to the specific listings disclosed but may be implemented in employing other listings or other computer languages.

While I have shown and described only one embodiment in accordance with the present invention, it is understood that the same is not limited thereto but is susceptible to numerous changes and modifications as known to one having ordinary skill in the art, and I therefore do not wish to be limited to the details shown and described herein but intend to cover all such modifications of hardware and software as are enompassed by the scope of the appended claims.

I claim:

1. For certain multiple color (R G B) systems specified herein the method of
   a. reading first signals representing unfiltered data for an additive color graphic image to be displayed on a color CRT output device of a computer,
   b. generating therefrom second signals representing needed data for recreating by printing a color facsimile of that display using subtractive pigment combinations which match the color of that display position by position,
   c. producing and displaying internegative images in black and white representing levels of each subtractive primary needed in printing the same on a three color press.

2. Multiple color systems method as set forth in claim 1 further comprising
   d. photographing the black and white internegative images from each of said data as displayed in step c of claim 1 to obtain the internegatives required by the printer to make control plates for the cyan, magenta and yellow units of his press.

3. For a multiple color system the method of
   a. generating first signals representing first data for unfiltered additive colors for a color graphic display, having light sources disposed in raster form,
   b. generating second signals representing second data for subtractive colors in response to at least said first signals, and
   c. displaying a portion of said second data representing only a single subtractive color.

4. A multiple color systems method as set forth in claim 3 further comprising
   d. preparing an internegative from said data displayed.

5. A multiple color systems method as set forth in claim 4 wherein step d comprises
   e. photographing said data displayed.

6. A multiple color systems method as set forth in claim 3 wherein said display of step c comprises two contrasting colors.

7. A multiple color systems method as set forth in claim 6 wherein the two contrasting colors are black and white.

8. The multiple color systems method as set forth in one of claims 3, 4, 5, 6 or 7 comprising
   f. repeating at least steps c, d and e to produce plural internegatives each representing a different color.

9. The multiple color systems method as set forth in one of claims 3 or 4 wherein step c comprises
   g. projecting a cathode ray beam to display an image of said portion of said second data in response to step b.

10. The multiple color systems method as set forth in one of claims 3, 4, 5, 6 or 7 wherein step c comprises
    h. producing hard copy computer peripheral output of an image of said portion of said second data in response to step b.

11. A multiple color system as set forth in claim 3 wherein the signals generated in step a include third signals represening background and foreground colors for a character to be displayed in said color graphic display and further comprising
    d. increasing color resolution by actuating a configuration of light sources in response to said third signals representing background and foreground colors to produce a character of color intermediate to the background and foreground colors.

12. A multiple color system in claim 11, wherein said light sources are configured in checkerboard fashion, a first group of light sources producing a background color, and a second group of light sources, alternating in position in two orthogonally different directions with respect to said first group of light sources, producing a foreground color.

13. A multiple color system as set forth in claim 3 wherein the step of generating first signals further comprises
    generating signals representing the presence level and absence of each primary additive color for each coordinate position in said raster.

14. A multiple color system as set forth in claim 13 further comprising
    establishing magnitudes for the presence level and absence of said each additive color according to the position of said primary additive color with respect to a color space.

15. A multiple color system as set forth in claim 14 wherein the step of generating second signals comprises
    transforming said magnitudes of said each primary additive color to magnitudes of corresponding subtractive colors according to the position of said subtractive color with respect to said color space.

16. For a multiple color system, the method of
    a. preparing an internegative from a computer output display the latter representing a single subtractive color only, and
    b. printing an image employing said internegative.

17. The multiple color system method of claim 16 wherein step a comprises
    c. photographing said computer output display representing a single subtractive color only.

18. For a multiple color system, apparatus comprising
    a. means for generating first signals representing first data for unfiltered additive colors for a color graphic display, the display having light source means,
    b. means for generating second signals representing second data for subtractive colors in response to said first signals, and
    c. means for displaying a portion of said second data representing only a single subtractive color.

19. A multi-color system apparatus as set forth in claim 18 further comprising
    d. means for preparing an internegative image of said data displayed.

20. A multiple color system as set forth in claim 19 wherein element d comprises
    e. means for photographing said data displayed.

21. A multiple color system as set forth in claim 18 wherein said display of element c is comprised of two contrasting colors.

22. A multiple color system as set forth in claim 21 wherein the two contrasting colors of the display are black and white.

23. The multiple color system apparatus as set forth in one of claims 18, 19, 20, 21 or 22 comprising
 f. means for repetitively operating elements c, d, and e to produce plural internegatives each representing a different color.

24. The multiple color system apparatus as set forth in one of claims 18 or 19 wherein element c comprises
 g. means for projecting a cathode ray beam to display an image of said portion of said second data in response to element b.

25. The multiple color system apparatus as set forth in one of claims 18, 19 20, 21 or 22 wherein element c comprises
 h. peripheral means connected to said computer for producing hard copy output of an image of said portion of said second data in response to element b.

26. A multiple color system was set forth in claim 18 wherein the means a comprises
 means for generating third signals representing background and foreground colors for a character to be displayed in said color graphic display, and
 further comprising
 means for increasing color resolution by activating a first configuration of said light sources in response to said third signals representing background and foreground colors to produce a character of color intermediate to the background and foreground colors.

27. A multiple color system as set forth in claim 26 wherein said light source means are configured in checkerboard fashion, a first group of light source means for producing a background color, and
 a second group of light source means, alternating in position in two orthogonally different directions with respect to said first group of light sources, for producing a foreground color.

28. A multiple color system as set forth in claim 18 wherein said means for generating first signals comprises
 means for generating signals representing the presence level and absence of each primary additive color for each coordinate position in said raster.

29. A multiple color system as set forth in claim 28 further comprising
 means for establishing magnitudes for the presence level and absence of said each additive color according to the position of said additive color with respect to a color space.

30. A multiple color system as set forth in claim 29 wherein said means for generating second signals comprises
 means for transforming said magnitudes of said each additive color to magnitudes of corresponding subtractive colors according to the position of said subtractive color with respect to said color space.

31. For a multiple color system, apparatus comprising
 a. means for preparing an internegative from a computer output display the latter representing a single subtractive color only, and
 b. means for printing an image employing said internegative.

32. The multiple color system apparatus of claim 31 wherein element a comprises
 c. means for photographing said computer output display representing a single subtractive color only.

* * * * *